(12) United States Patent
Aleynikov et al.

(10) Patent No.: US 11,987,457 B2
(45) Date of Patent: May 21, 2024

(54) COORDINATED BRAKING SYSTEMS AND METHODS FOR RAIL CARS

(71) Applicant: Amsted Rail Company, Inc., Chicago, IL (US)

(72) Inventors: Igor Aleynikov, St. Louis, MO (US); Paul Wike, St. Louis, MO (US); Tom Petrunich, Troy, IL (US)

(73) Assignee: Amsted Rail Company, Inc., Chicago, IL (US)

( * ) Notice: Subject to any disclaimer, the term of this patent is extended or adjusted under 35 U.S.C. 154(b) by 481 days.

(21) Appl. No.: 17/242,412

(22) Filed: Apr. 28, 2021

(65) Prior Publication Data

US 2022/0348428 A1 Nov. 3, 2022

(51) Int. Cl.

| | |
|---|---|
| *B65G 67/48* | (2006.01) |
| *B60T 8/17* | (2006.01) |
| *B60T 8/18* | (2006.01) |
| *B61D 9/02* | (2006.01) |
| *B61H 13/30* | (2006.01) |
| *B61J 3/00* | (2006.01) |

(52) U.S. Cl.
CPC ............ *B65G 67/48* (2013.01); *B60T 8/1705* (2013.01); *B60T 8/1893* (2013.01); *B61D 9/02* (2013.01); *B61H 13/30* (2013.01); *B61J 3/00* (2013.01)

(58) Field of Classification Search
CPC ..... B65G 67/48; B60T 8/1705; B60T 8/1893; B61D 9/02; B61H 13/30; B61J 3/00; B61C 17/12
See application file for complete search history.

(56) References Cited

U.S. PATENT DOCUMENTS

| | | | |
|---|---|---|---|
| 6,401,015 B1 | 6/2002 | Stewart | |
| 8,239,078 B2 * | 8/2012 | Siddappa | ................ B61L 3/006 |
| | | | 455/92 |
| 8,479,660 B2 * | 7/2013 | Brandt | ..................... B61D 7/30 |
| | | | 105/241.2 |
| 10,674,137 B2 * | 6/2020 | Akaike | .................... G06T 15/02 |
| 2005/0189815 A1 * | 9/2005 | Bryant | ................... B61C 17/12 |
| | | | 303/3 |

(Continued)

FOREIGN PATENT DOCUMENTS

| | | |
|---|---|---|
| WO | WO 99/47402 | 9/1999 |
| WO | WO 02/22425 | 3/2002 |
| WO | WO 2019/005071 | 1/2019 |

OTHER PUBLICATIONS

R. Bowey et al., "Monitoring, managing and mitigating in-train forces", Proceedings of the 11th International Heavy Haul Association Conference (IHHA 2017), Cape Town, South Africa, Sep. 2-6, 2017, pp. 1007-1013.

(Continued)

*Primary Examiner* — Khoi H Tran
*Assistant Examiner* — Bryant Tang
(74) *Attorney, Agent, or Firm* — Joseph M. Butscher; The Small PAtent Law Group LLC

(57) ABSTRACT

A system and method include a train including a plurality of rail cars configured to travel along a track having rails. Each of the plurality of rail cars includes brakes. A braking control unit is in communication with the brakes of the plurality of rail cars. The braking control unit is configured to control the brakes of a subset of the plurality of rail cars in accordance with braking data.

24 Claims, 5 Drawing Sheets

(56) References Cited

U.S. PATENT DOCUMENTS

| | | | |
|---|---|---|---|
| 2014/0277845 A1* | 9/2014 | Paulino | B61L 3/127 |
| | | | 701/2 |
| 2019/0168728 A1* | 6/2019 | Venkatasubramanian | |
| | | | B60T 13/665 |
| 2020/0361433 A1* | 11/2020 | Raj | B60T 17/228 |
| 2021/0391769 A1* | 12/2021 | Picchi | F03G 7/0641 |

OTHER PUBLICATIONS

Robert Boelen et al., "Ore-car coupler performance at BHP-Billiton Iron Ore", Engineering Failure Analysis 11 (2004) 221-234, pp. 221-234.

International Search Report and Written Opinion for PCT/US2022/026258, dated Aug. 11, 2022.

International Preliminary Report on Patentability sent Nov. 9, 2023.

* cited by examiner

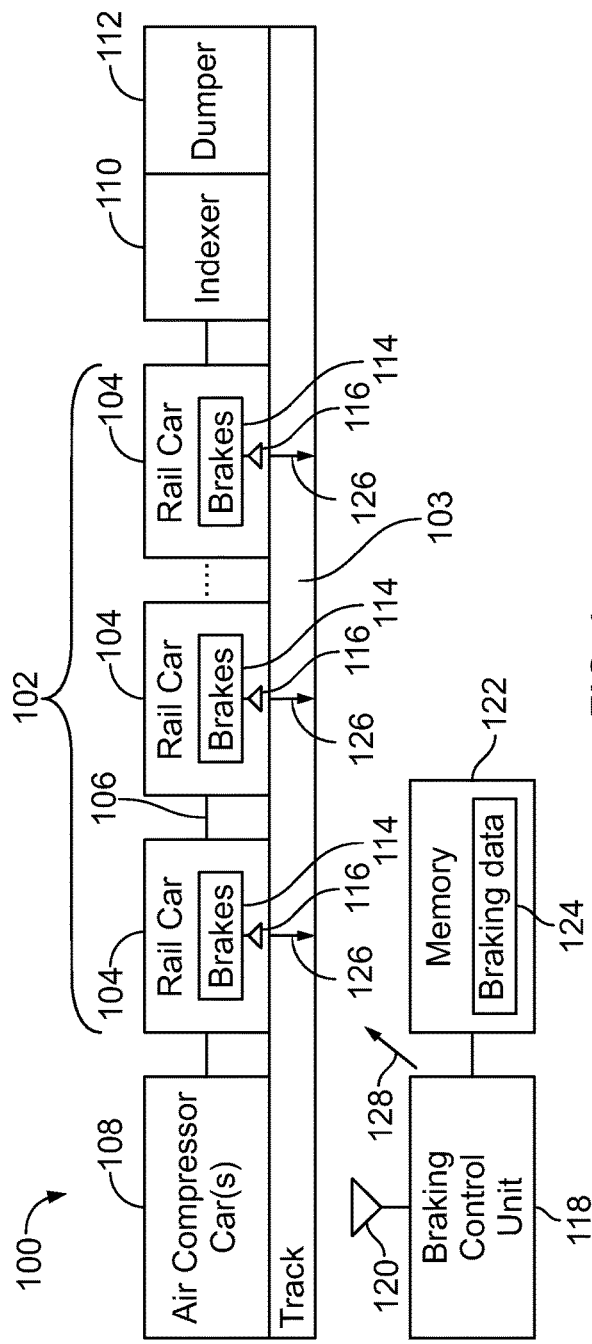
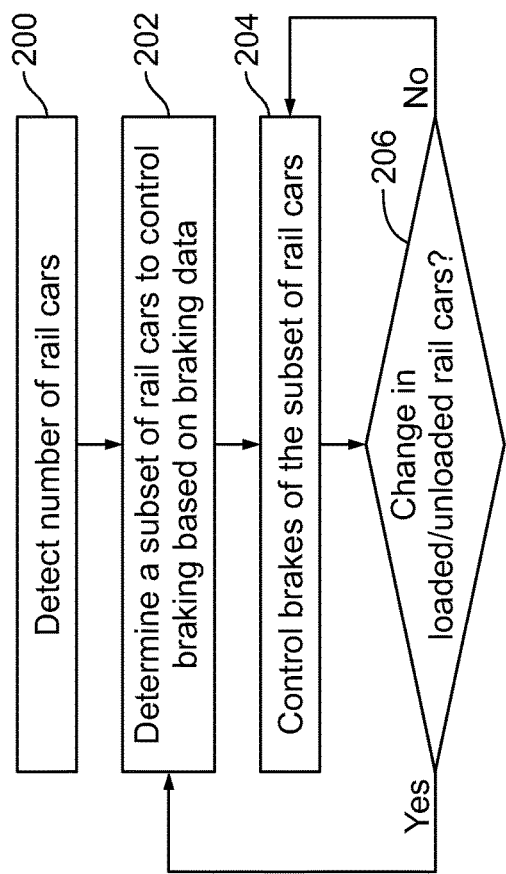
FIG. 1
FIG. 2

COORDINATED BRAKING SYSTEMS AND METHODS FOR RAIL CARS

FIELD OF THE DISCLOSURE

Embodiments of the present disclosure generally relate to braking systems and methods for rail vehicles, such as rail cars.

BACKGROUND OF THE DISCLOSURE

Rail vehicles travel along railways, which have tracks that include rails. A rail vehicle includes one or more truck assemblies that support one or more car bodies.

As an example, dedicated iron ore trains transport ore from mines to a different location, such as an unloading facility. Certain trains include railcars with increased capacity in terms of axle loading, and may even have up to 330 rail cars in a single train. The rail cars typically utilize bogies and draft and coupling systems based on standards established in the United States by the Association of American Railroads.

The draft and coupling systems are mechanically joined to the rail car by a mechanism that allows movement in tension, compression, and angularity. The tolerance in the mechanism is approximately 0.5 inches, and can increase over time with wear.

The draft system is a cushion system with 2.75-3.25 inches travel in tension and compression that is preloaded with a force up to 900,000 lbs. at full displacement. The cushioning becomes solid when exerted force exceeds capacity.

The coupling system includes a coupler body and a knuckle that opens and locks to couple adjacent railcars. The coupling system is designed for loads up to one million pounds in either direction. If the forces exceed the capacity, the knuckle is designed to fail rather than damage other parts of the rail car. Spare knuckles are carried on the train for replacement if needed.

At an unloading facility, the train is moved by an indexer which moves downwardly connects to couplers between the cars. The indexer typically moves two rail car lengths at a time to a dumper. The dumper then clamps the two rail cars and rolls them over 180 degrees for unloading into a pit with a conveyor that transports the dumped contents (for example, the ore) to a staging area. The unloaded rail cars are rotated back to a vertical orientation, and the indexer selects the next two railcars and starts the process again. The entire train stays coupled together during the indexing and dumping operations.

However, indexer movement is not simultaneous. Consequently, each rail car starting or stopping creates a wave of energy that is transmitted through the entire length of the train. The energy, if not contained, can create peak forces that tend to damage and fatigue the coupler knuckles.

Further, the track running through the unloading facility can have elevation changes (that is, changes in grade) that add to wave energy of the train as it is being indexed to the dumper. In many cases, the grade is up-hill to flat at the dumper, and up-hill exiting the facility. As such, there can be a ripple effect of starting the cars and a reverse ripple as cars tend to rollback when the indexer stops.

To reduce such wave energy effects, attempts are being made to keep the train stretched such that it provides a more simultaneous movement of the rail cars. For example, two rail cars are added to the end of the train. These rail cars are referred to as air compressor cars with a large air compressor on one and large air tanks on the other. These two rail cars apply their air brakes. The air brakes even at full application retard the movement of the train, but allow the wheels of the rail cars to roll. The two air compressor cars are very sensitive to changes in the train length as the train is indexed.

However, the improvements provided by the air compressor cars were only found to be effective for a few cars at the beginning of the train, and a few cars at the end of the train. The majority of cars of the train still had an unconstrained wave of energy sweeping through them.

SUMMARY OF THE DISCLOSURE

A need exists for a system and method for coordinating braking of rail cars that are being indexed. Further, a need exists for a system and method for reducing wave energy traveling through rail cars of a train being indexed and dumped.

With those needs in mind, certain embodiments of the present disclosure provide a system including a train having a plurality of rail cars configured to travel along a track having rails. Each of the plurality of rail cars includes brakes. A braking control unit is in communication with the brakes of the plurality of rail cars. The braking control unit is configured to control the brakes of a subset of the plurality of rail cars in accordance with braking data.

The braking data is based on a number of the plurality of rail cars of the train, a grade of the track, a weight of each of the plurality of rail cars, and/or contents of each of the plurality of rail cars.

In at least one embodiment, the system further includes one or more air compressor cars coupled to one of the plurality of rail cars at an end of the train. The one or more compressor cars include one or more air tanks and one or more air pumps that are configured to provide compressed air to the brakes.

In at least one embodiment, the system further includes an indexer along the track. The indexer is configured to engage one or more of the plurality of rail cars. Further, a dumper is along the track. The dumper is configured to dump contents from one or more of the plurality of rail cars.

As an example, the braking control unit is remote from the train.

In at least one embodiment, the subset of the plurality of rail cars includes at least two braking rail cars separated by a plurality of uncontrolled rail cars. The brakes of the at least two braking rail cars are controlled by the braking control unit. The brakes of the plurality of uncontrolled rail cars are not controlled by the braking control unit. As an example, the plurality of uncontrolled rail cars includes at least nine uncontrolled rail cars.

In at least one embodiment, the braking control unit is further configured to automatically determine a number of rail cars of the train.

In at least one example, the system further includes a communication device removably coupled to one or more of the plurality of rail cars. The communication device allows for communication with the braking control unit.

In at least one example, the system further includes a portable air supply removably coupled to the one or more of the plurality of rail cars.

Certain embodiments of the present disclosure provide a method including communicatively coupling a braking control unit brakes of a plurality of rail cars of a train that is configured to travel along a track having rails; and controlling, by the braking control unit, the brakes of a subset of the plurality of rail cars in accordance with braking data.

BRIEF DESCRIPTION OF THE DRAWINGS

FIG. 1 illustrates a schematic block diagram of a system for coordinating braking within a train, according to an embodiment of the present disclosure.

FIG. 2 illustrates a flow chart of a method for coordinating braking within a train, according to an embodiment of the present disclosure.

DETAILED DESCRIPTION OF THE DISCLOSURE

Figure 3:
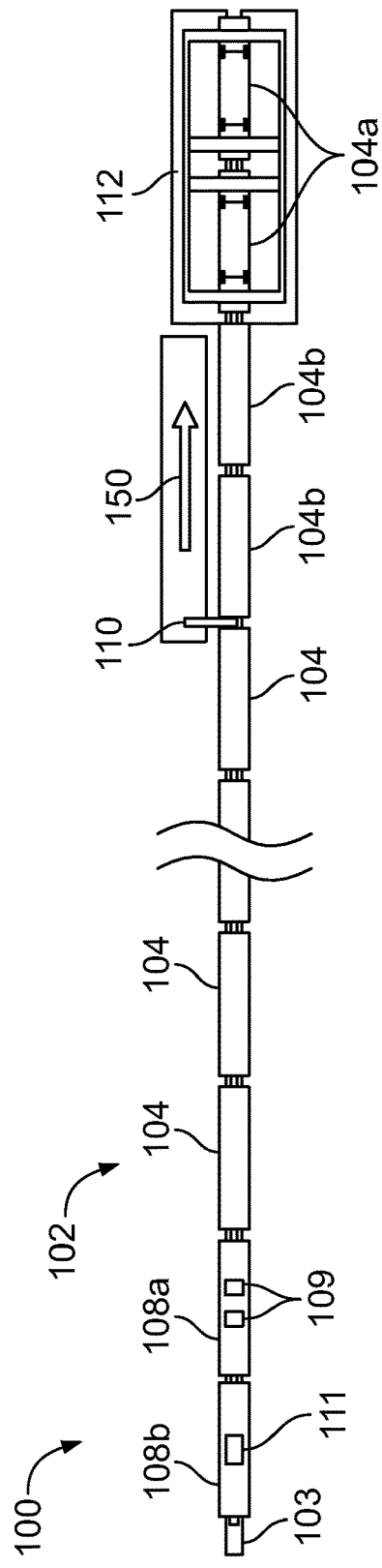
FIG. 3 illustrates a top view of a system for coordinating braking within a train, according to an embodiment of the present disclosure.

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

FIG. 1 illustrates a schematic block diagram of a system 100 for coordinating braking within a train 102, according to an embodiment of the present disclosure. The train 102 travels over a track 103 having rails. The train 102 includes a plurality of rail cars 104 coupled together. Adjacent rail cars 104 are connected together through couplers 106. The train 102 can include any number of rail cars 104. For example, the train 102 includes one hundred or more rail cars 104. As a further example, the train 102 includes at least three hundred rail cars 104. Optionally, the train 102 can include more or less than three hundred rail cars 104. For example, the train 102 can include less than one hundred rail cars 104.

One or more air compressor cars 108 are coupled to a rail car 104 at the end of the train 102, opposite from an indexer 110 and a dumper 112. The air compressor car(s) 108 include one or more air tanks and one or more air pumps that are configured to provide compressed air to brakes 114 of the rail cars 104 via an air line extending through the train 102. For example, the brakes 114 are air brakes.

The indexer 110 is along the track 103. The indexer 110 is configured to engage the plurality of rail cars 104, as described herein. The dumper 112 is also along the track 103. The dumper 112 is configured to dump contents from the plurality of rail cars 104, as described herein.

Typically, the train 102 is moved to the indexer 110 via one or more locomotives. The locomotive(s) may then uncouple from the train 102, or remain attached after the locomotive(s) have located the first cars 104 in the indexer 110 and/or the dumper 112. The rail cars 104 are moved by the indexer 110 to the dumper 112, as described herein. The rail cars 104 themselves typically are not locomotives. Instead, the rail cars 104 can be configured to carry contents, such as ore, coal, freight, and/or the like. The contents of each rail car 104 can be dumped via the dumper 112, as described above.

The brakes 114 of the rail cars 104 are coupled to a communication device 116, such as a radio, antenna, transceiver, and/or the like. The communication device 116 allows the brakes 114 to be remotely controlled.

A braking control unit 118 is in communication with the brakes 114 of the rail cars 104. For example, the braking control unit 118 includes a communication device 120, such as a radio, antenna, transceiver, and/or the like. The braking control unit 118 includes or is otherwise communicatively coupled with a memory 122.

In at least one embodiment, the braking control unit 118 is remote from (for example, separate and distinct from) the train 102. For example, the braking control unit 118 is at a central monitoring location, such as proximate to the indexer 110 and the dumper 112. As an example, the braking control unit 118 can be at an entrance to a facility that includes the indexer 110 and the dumper 112. As another example, the braking control unit 118 can be part of the indexer 110 or the dumper 112. As another example, the braking control unit 118 can be onboard the air compressor car(s) 108. Alternatively, the braking control unit 118 can be on one of the rail cars 104.

The memory 122 stores braking data 124 for the train 102. The braking data includes braking information regarding braking a subset of the rail cars 104. In at least one embodiment, the braking information is based on a length of the train (for example, the number of rail cars), the grade or angle of the track 103, the weight of the rail cars 104, the weight of the contents of the rail car, and/or the like. The braking data 124 can change as the number of rail cars 104 decreases or increases. For example, as rail cars 104 are removed from the train 102 by the indexer 110, the braking data can change.

The braking data 124 includes information and instructions for operating the brakes 114 of a subset (that is, less than all) of the rail cars 104 as the indexer 110 engages one or more of the rail cars 104. For example, the braking data 124 includes instructions for operating the brakes 114 of a staggered number of the rail cars 104, such as every tenth rail car 104, every twentieth rail car 104, every thirtieth rail car 104, or the like within the train 102. As an example, if the train 102 includes three hundred rail cars 104, the braking data 124 instructs the braking control unit 118 to operate the brakes 114 of every tenth rail car 104, such as the first rail car 104 immediately following the rail car(s) 104 being engaged by the indexer 110, the eleventh rail car 104 (with the second through tenth rail cars 104 not having their brakes 114 controlled), the twenty-first rail car 104, and so on. As rail cars 104 are emptied by the dumper 112, the braking data 124 may instruct the braking control unit 118 to increase the staggered control of the brakes 114 of the rail cars 104 to more than every tenth, such as every twentieth, etc. Not all of the brakes 114 may be controlled at once, as the air compressor car(s) 108 may not have sufficient air supply to provide to the brakes 114 of all the rail cars 104. Instead, the braking control unit 118 controls the brakes 114 of a predetermined subset of the rail cars 104, in order to efficiently utilize the air provided by the air compressor car(s) 108, and minimize or otherwise reduce the wave energy traveling through the train 102.

In operation, as the train 102 enters the facility that includes the indexer 110 and the dumper 112, the communication devices 116 of the rail cars 104 output a detection signal 126 (such as a radio signal), which is received by the braking control unit 118. By detecting the detection signals 126, the braking control unit 118 determines the number of rail cars 104 within the train 102. As loaded rail cars 104 (for example, loaded with ore) are moved by the indexer 110, the braking control unit 118 updates the number of loaded rail cars 104 within the train 102. The braking control unit 118 then analyzes the braking data 124 within the memory 122 in relation to the number of rail cars 104 within the train to control the brakes 114 of a subset of the rail cars 104, according to the braking data 124. The braking control unit 118 then transmits control signals 128 (such as radio signals) that are received by the communication devices 116 of the subset of rail cars 104. The brakes 114 of the subset of rail cars 104 are then controlled according to the received control signals 128.

Optionally, the braking control unit 118 may determine the number of rail cars 104 through other devices, such as optical devices (for example, cameras). As another example, the number of rail cars 104 may be input into the braking control unit 118, such as via a user interface having a keyboard, mouse, or the like. Alternatively, the braking control unit 118 may not determine the number of rail cars 104, but may simply control operation of the brakes 114 of a predetermined subset of the rail cars 104, according to the braking data 124.

As described herein, the system 100 includes the train 102 including the plurality of rail cars 104 configured to travel along the track 103. Each of the plurality of rail cars 104 brakes 114. The braking control unit 118 is in communication with the brakes 114 of the plurality of rail cars 104. The braking control unit 118 is configured to adaptively control (for example, based on changing aspect of the train 102, including number of rail cars 104, the grade of the track 103, weight of the rail cars 104, contents of the rail cars 104, etc.) the brakes 114 of a subset (that is, not all) of the plurality of rail cars 104 in accordance with the braking data 124.

In at least one embodiment, the braking data 124 is based on a number of the plurality of rail cars 104 of the train 102. As another example, the braking data 124 is based on a grade of the track 103. As another example, the braking data 124 is based on one or both of a weight of each of the plurality of rail cars 104 or contents of each of the plurality of rail cars 104. In at least one embodiment, the braking data 124 is based on a number of the plurality of rail cars 104 of the train 102, on a grade of the track 103, and one or both of a weight of each of the plurality of rail cars 104 or contents of each of the plurality of rail cars 104.

As another example, the braking data 124 is monitored by an instrumented coupler (or multiple instrumented couplers) located in the plurality of railcars 104 and based on data from the couplers control the brakes 114 of a subset of the plurality of rail cars 104. For example, the instrumented coupler can include the braking control unit 118. An instrumented coupler is a coupler configured to accept strain gages, or other sensors, that are arranged to complete an electronic circuit that result in the measurement of forces being applied to the coupler body.

FIG. 2 illustrates a flow chart of a method for coordinating braking within a train, according to an embodiment of the present disclosure. Referring to FIGS. 1 and 2, at 200, the braking control unit 118 determines the number of rail cars 104 within the train 102. At 202, the braking control unit 118 determines a subset of rail cars 104 to control braking based on the braking data 124. The braking data 124 includes information regarding the subset, such as may be based on the total number of rail cars 104 within the train 102, the grade or angle of the track 103, the weight of the rail cars 104, the contents and/or weight of the contents of the rail cars 104, and/or the like. The braking control unit 118 compares the number of loaded rail cars 104 to an ever-changing number of unloaded rail cars 104, for example. In at least one embodiment, the number of rail cars 104 of the train 102 remains constant, but the ratio of loaded to unloaded rail cars 104 changes (for example, decreases) as the rail cars 104 are dumped, unloaded, and emptied.

At 204, the braking control unit 118 controls the brakes 114 of the subset of the rail cars 104 as determined by the braking data 124. At 206, the braking control unit 118 determines if the number of loaded rail cars 104 within the train 102 has changed in relation to a number of unloaded rail cars 104 (for example, the number of loaded rail cars 104 decreases as the number of unloaded cars 104 increases). If not, the method returns to 204. If the number has changed, the method returns to 202. Accordingly, the braking control unit 118 is configured to adaptively adjust the braking scheme (that is, the subset of rail cars 104 operated as braking rail cars 104) as the number or loaded/unloaded rails cars 104 of the train 102 changes. The method may continue until all the rail cars 104 have passes through the indexer 110 and the dumper 112.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the braking control unit 118 can be or include one or more processors that are configured to control operation thereof, as described herein.

The braking control unit 118 is configured to execute a set of instructions that are stored in one or more data storage units or elements (such as one or more memories), in order to process data. For example, the braking control unit 118 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the braking control unit 118 as a processing machine to perform specific operations such as the methods and processes of the various embodiments of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of embodiments herein illustrate one or more control or processing units, such as the braking control unit 118. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the braking control unit 118 can represent processing circuitry such as one or more of a field programmable gate array (FPGA), application specific integrated circuit (ASIC), microprocessor(s), and/or the like. The circuits in various embodiments can be configured to execute one or more algorithms to perform functions described herein. The one or more algorithms can include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Embodiments of the present disclosure provide systems and methods that allow large amounts of data to be quickly and efficiently analyzed by a computing device. For example, as noted, a train may include hundreds of rail cars with various parameters to consider. The vast amounts of data are efficiently organized and/or analyzed by the braking control unit 118, as described herein. The braking control unit 118 analyzes the data in a relatively short time in order to generate a decision regarding the subset of rail cars to designate and control as braking rail cars. A human being would be incapable of analyzing such vast amounts of data in a time that allows for a quick and efficient decision regarding effective and efficient braking, as described herein. As such, embodiments of the present disclosure provide increased and efficient functionality, and vastly superior performance in relation to a human being analyzing the enormous amounts of data. In short, embodiments of the present disclosure provide systems and methods that analyze thousands, if not more, of calculations and computations that a human being is incapable of efficiently, effectively, and accurately managing.

As described herein, embodiments of the present disclosure provide systems and methods that are configured to balance forces between the rail cars 104 and reduce potential damaging inertia between the rail cars 104, such that little or no fatigue damage occurs to the couplers (for example, knuckles) between the rail cars 104. The systems and methods provide sufficient trailing braking weight to mitigate or otherwise reduce wave action created by the individual inertia of the rail cars 104. The subset of rail cars 104 to control (that is, the brakes 114 of the subset of rail cars 104) is set forth in the braking data 124 stored in the memory 122, and may be determined by the number of loaded and unloaded rails cars 104 within the train 102, a train length (that is, the number of rail cars 104 of the train 102), and/or the like. When air brakes are fully applied, only 13 percent of the total car weight is being applied as braking. Even though movement of the cars is being retarded, the cars may still move. As the number of rail cars 104 to the dumper 112 decreases, the subset (that is, the number of braking cars) can be reduced. In this manner, the braking control unit 118 continually monitors the rail cars 104, updates the subset to control accordingly, and operates the brakes 114 of the subset of rail cars 104 to balance pulling and pushing forces from creating overwhelming inertias.

In at least one embodiment, the brakes 114 are air brakes that are coupled with an electronically controlled pneumatic (ECP) system, such as includes or is otherwise controlled by the braking control unit 118. When the train 102 is being unloaded the air brake system is not in use. The train 102 is started, moved, and stopped via the indexer 110. The braking rail cars 104 (that is, the subset of rail cars 104 having brakes 114 controlled by the braking control unit 118) can have an independent portable air supply and/or use the air supply provided by the air compressor car(s) 108. The air supply of the air compressor car(s) 108 can be routed through an air line of the train 102 to all the rail cars 104. In at least one embodiment, the air compressor car(s)s and the braking rail cars 104 (that is, the subset of rail cars 104 having brakes 114 controlled by the braking control unit 118) can have individual radio frequencies. As noted, the braking control unit 118 can determine the number of rail cars 104 in the train 102, the number of the air compressor cars 108, and the number of braking rail cars 104. Based on the braking data 124, the braking control unit 118 further determines the amount of air pressure or retarding force to apply to the wheels via the brakes 114 of the braking rail cars 104 (that is, the subset of rail cars 104 having brakes that are controlled). Also, based on the braking data 124, the braking control unit 118 can determine when to start applying, and subsequently release the brake force for the braking rail cars 104.

The braking control unit 118 is configured to designate certain rail cars 104 as the braking rail cars 104 based on the braking data 124 stored in the memory 122. The air supplied to the brakes 114 of the braking rail cars 104 can be provided by the air compressor car(s) 108, via the air line, and/or through portable air supplies coupled to the brakes 114.

The distributed braking rail cars 104 are able to hold groups of the rail cars 104 on the track 103, and keep them from rolling back on each other. As such, the systems and methods described herein eliminate, minimize, or otherwise reduce large build up slack and stored compressed draft system cushioning that is released when the indexer 110 starts pulling the rail cars 104 up the track 103.

Figure 4:
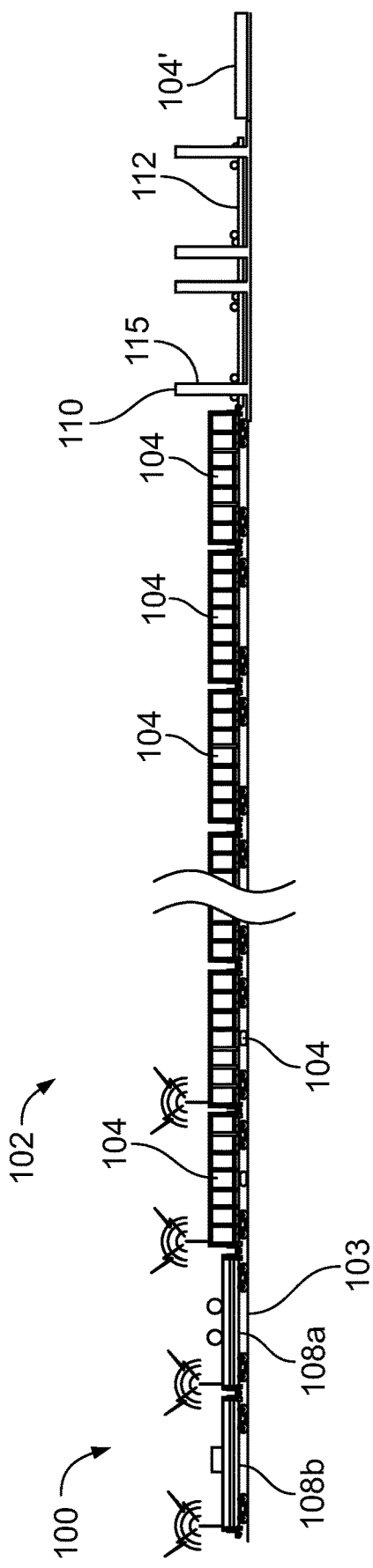
FIG. 4 illustrates a lateral view of the system of FIG. 3.

FIG. 3 illustrates a top view of a system 100 for coordinating braking within a train 102, according to an embodiment of the present disclosure. FIG. 4 illustrates a lateral view of the system 100 of FIG. 3. Referring to FIGS. 3 and 4, the indexer 110 and the dumper 112 are at an unloading facility, for example. A first air compressor car 108*a* includes one or more air tanks 109. A second air compressor car 108*b* includes an air pump 111. Optionally, a single air compressor car 108 can include both the air tanks 109 and the air pump 111.

In at least one embodiment, the rail cars 104 are loaded with contents, such as ore, coal, or the like. The rail cars 104 are in line to be engaged by the indexer 110 and dumped via the dumper 112. Unloaded cars 104' move past the dumper 112.

As an example, the train 102 can include 330 or more rail cars 104. As the train 102 enters the unloading facility, a locomotive of the train 102 positions the leading two cars 104*a* in the dumper 112. The air brakes of the rail cars 104 are released and the entire train 102 is started, moved, and stopped by the indexer 110. As an example, the indexer 110 has an arm 115 that swings in from vertical to the couplers between two loaded rail cars 104. Once in place, the indexer 110 moves two car lengths 150, which places the next two rail cars 104*b* in the dumper 112. The rail cars 104 have rotating couplers on one end such that the rail cars 104 in the dumper 112 rotate about the centerline of the rotating couplers. The rail cars 104 in the dumper 112 rotate sufficiently to allow the contents therein to be discharged by gravity. After the rail cars 104 are unloaded, they are rotated back to vertical. The next two loaded rail cars 104 are moved two car lengths 150 by the indexer 110, which also pushes two unloaded cars 104' out of the dumper 112.

Figure 5:
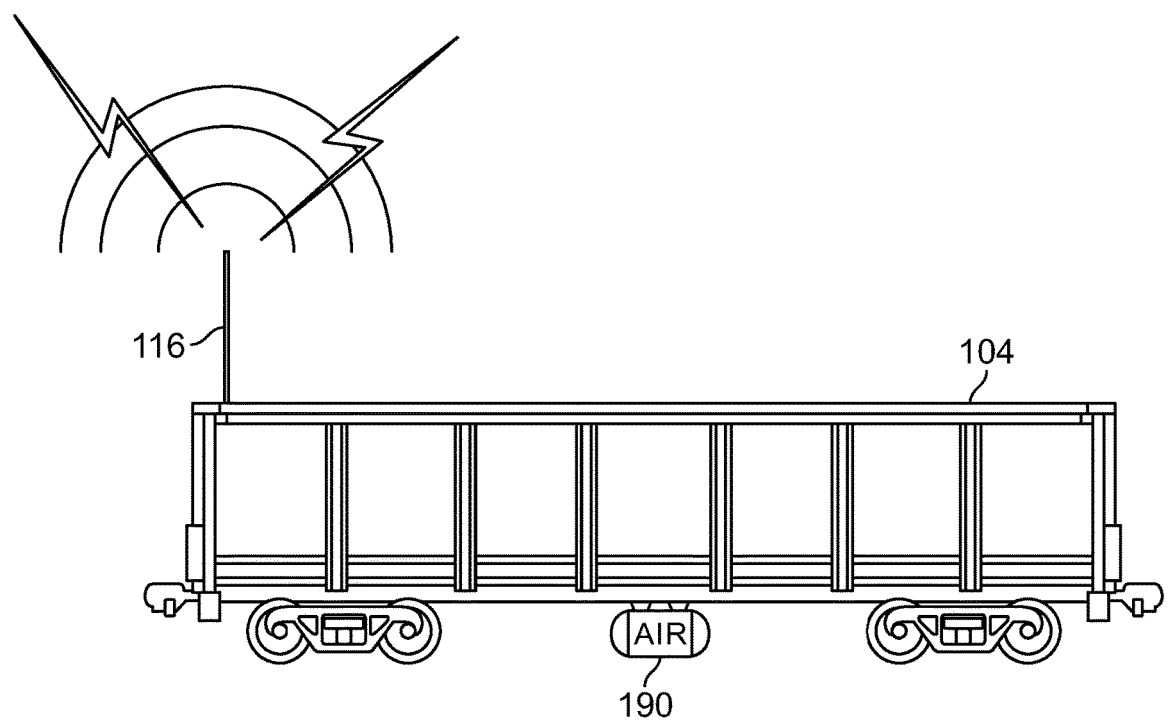
FIG. 5 illustrates a lateral view of a braking rail car, according to an embodiment of the present disclosure.

FIG. 5 illustrates a lateral view of a braking rail car 104, according to an embodiment of the present disclosure. In at least one embodiment, an air supply 190 can be directly coupled to the brakes 114 (shown in FIG. 1). As such, the air supply 190 can provide air to the brakes 114 in place of, or in addition to, the air supplied via the air compressor car(s) 108. The communication device 116 can be a portable radio frequency device in communication with the brakes 114.

In at least one embodiment, an ECP brake system is hard wired throughout the train 102. The portable air supply 190 can be a 90 psi, 8 CFM air supply, powered by 12-volt batteries. The communication device 116 and the air supply 190 can be portable, and added to the rail car 104 as it arrives at an unloading facility, and removed before departure from the unloading facility. In this manner, the communication device 116 and the air supply 190 may be removably coupled to the rail car 104 in that they can be secured to and removed therefrom.

Figure 6:
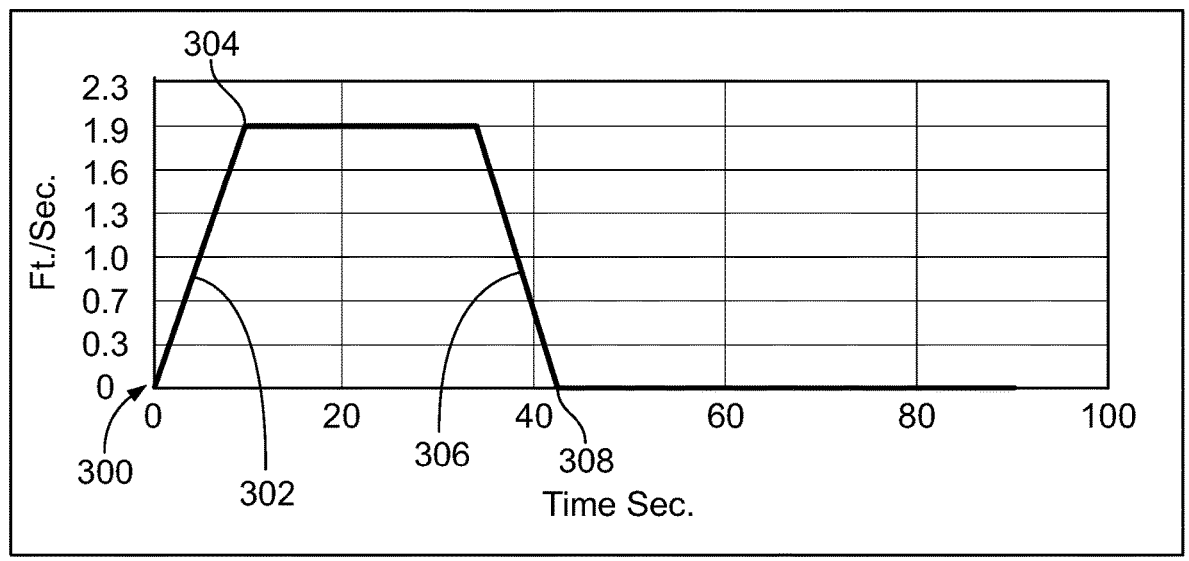
FIG. 6 illustrates a chart of indexer velocity and time for a cycle, according to an embodiment of the present disclosure.

FIG. 6 illustrates a chart of indexer velocity and time for a cycle, according to an embodiment of the present disclosure. Full braking occurs at 300. Start and acceleration to constant speed 302 occurs between 300 and 304. Deceleration to stop 306 ends at full braking 308. The balance of the cycle time is the rail cars 104 being emptied by the dumper.

In at least one embodiment, a dynamic model of the train is used to determine the location, number of brake cars and brake force to be applied. In at least one distributed braking car scheme, brakes of the subset of rail cars can be fully set at the beginning of movement of the indexer. At 302, braking rail cars proximate to the dumper release their brakes (as controlled by the braking control unit 118 shown in FIG. 1). A staggered release of brakes limits wave action energy from growing throughout the train. During 306, the staggered braking is again applied (via operation of the braking control unit 118) and held while emptying by the dumper.

Braking can occur during 302 and while the rail cars are being emptied by the dumper. The number of braking rail cars, and their location can be determined based on a desired amount of mitigation of wave energy action.

Figure 7:
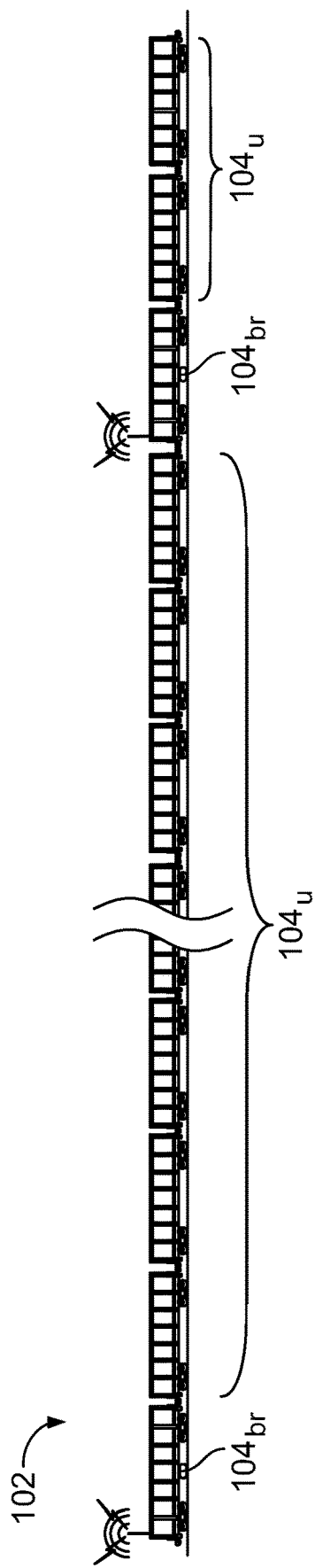
FIG. 7 illustrates a lateral view of a train, according to an embodiment of the present disclosure.

FIG. 7 illustrates a lateral view of the train 102, according to an embodiment of the present disclosure. The train 102 includes a subset of rail cars $104_{br}$ that are controlled by the braking control unit 118 (shown in FIG. 1) as braking rail cars. The braking rail cars $104_{br}$ are staggered and separated by uncontrolled rail cars $104_u$, which are not among the subset of rail cars having brakes controlled by the braking control unit 118. The subset can change as the number of rail cars within the train 102 changes. For example, as rail cars are unloaded (or optionally removed from the train 102), one or more of the rail cars $104_{br}$ (or become unloaded) can be changed to an uncontrolled rail car $104_u$, or vice versa.

Referring to FIGS. 1 and 7, a subset of the plurality of rail cars 104 includes at least two braking rail cars $104_{br}$ separated by a plurality of uncontrolled rail cars $104_u$. The brakes 114 of the at least two braking rail cars $104_{br}$ are controlled by the braking control unit 118. The brakes 114 of the plurality of uncontrolled rail cars $104_u$ are not controlled by the braking control unit 118.

Figure 8:
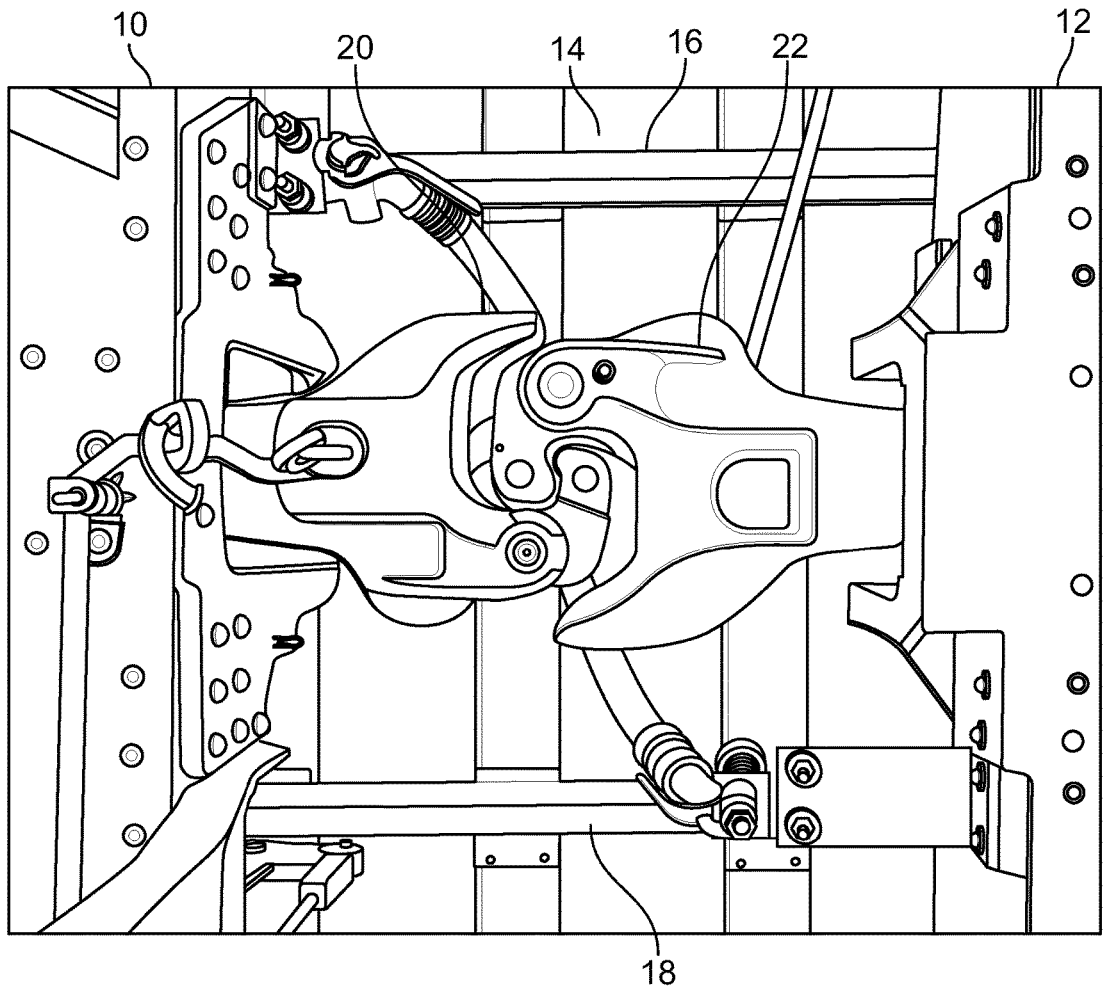
FIG. 8 illustrates a top view of a first rail car coupled to a second rail car.

FIG. 8 illustrates a top view of a first rail car 10 coupled to a second rail car 12. The first rail car 10 and the second rail car 12 are examples of the rail cars 104, shown in FIG. 1. The first rail car 10 and the second rail car 12 are configured to travel along a track 14 (such as the track 103 shown in FIG. 1) having rails 16 and 18. A coupler 20 of the first rail car 10 connects to a coupler 22 of the second rail car 12.

FIG. 8 show examples of rail cars 10 and 12, as well as couplers 20 and 22. The rail cars 10 and 12 can be sized, shaped, and/or configured differently than shown. Further, the couplers 20 and 22 can be sized, shaped, oriented, and/or configured differently than shown. For example, the couplers 20 and 22 can include bottom operated uncoupling levers.

Figure 9:
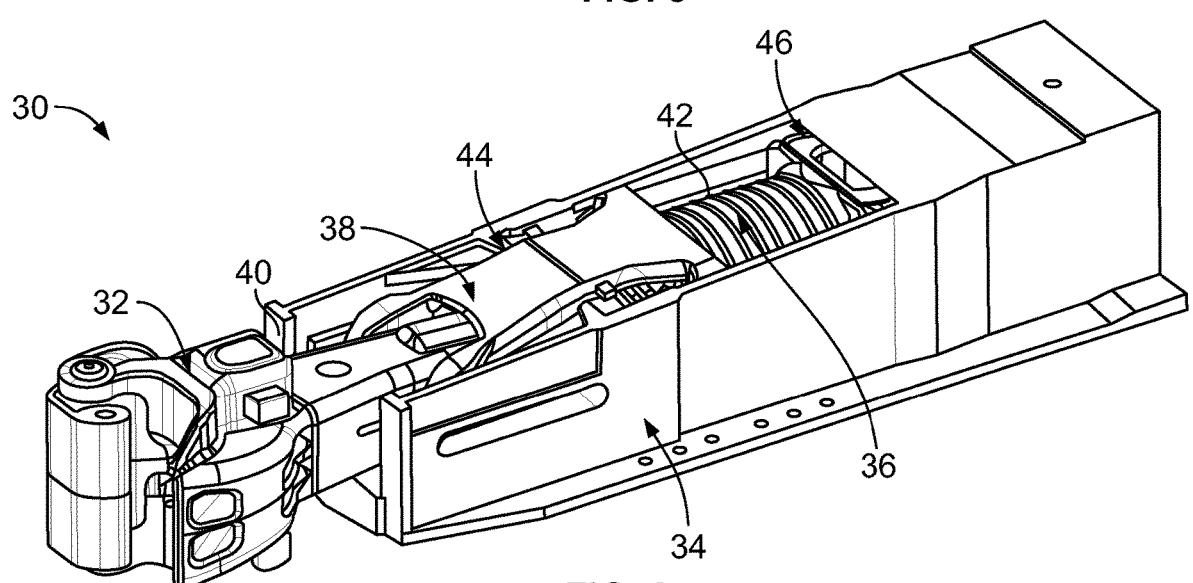
FIG. 9 illustrates a perspective top view of a car coupling system.

FIG. 9 illustrates a perspective top view of a car coupling system 30. The first rail car 10 and the second rail car 12 include a car coupling system 30. The car coupling system 30 includes a coupler 32 (such as the coupler 20 or the coupler 22 shown in FIG. 8), a draft sill 34, and a draft gear 36 with yoke 38. The coupler 32 is supported at a first end 40 by the draft sill 34 and at an opposite second end 42 by the draft gear 36 or cushion unit with the yoke 38. The draft gear 36 or cushion unit is constrained within the draft sill 34 by a pair of front stops 44 and a pair of rear stops 46.

Further, the disclosure comprises embodiments according to the following clauses:

Clause 1. A system comprising:
  a train including a plurality of rail cars configured to travel along a track having rails, wherein each of the plurality of rail cars comprises brakes; and
  a braking control unit in communication with the brakes of the plurality of rail cars,
  wherein the braking control unit is configured to control the brakes of a subset of the plurality of rail cars in accordance with braking data.

Clause 2. The system of Clause 1, wherein the braking data is based on a number of the plurality of rail cars of the train.

Clause 3. The system of Clauses 1 or 2, wherein the braking data is based on a grade of the track.

Clause 4. The system of any of Clauses 1-3, wherein the braking data is based on one or both of a weight of each of the plurality of rail cars or contents of each of the plurality of rail cars.

Clause 5. The system of any of Clauses 1-4, further comprising one or more air compressor cars coupled to one of the plurality of rail cars at an end of the train, wherein the one or more compressor cars comprise one or more air tanks and one or more air pumps that are configured to provide compressed air to the brakes.

Clause 6. The system of any of Clauses 1-5, further comprising:
an indexer along the track, wherein the indexer is configured to engage one or more of the plurality of rail cars; and
a dumper along the track, wherein the dumper is configured to dump contents from one or more of the plurality of rail cars.

Clause 7. The system of any of Clauses 1-6, wherein the braking control unit is remote from the train.

Clause 8. The system of any of Clauses 1-7, wherein the subset of the plurality of rail cars comprises at least two braking rail cars separated by a plurality of uncontrolled rail cars, wherein the brakes of the at least two braking rail cars are controlled by the braking control unit, and wherein the brakes of the plurality of uncontrolled rail cars are not controlled by the braking control unit.

Clause 9. The system of Clause 8, wherein the plurality of uncontrolled rail cars comprises at least nine uncontrolled rail cars.

Clause 10. The system of any of Clauses 1-9, wherein the braking control unit is further configured to automatically determine a number of rail cars of the train.

Clause 11. The system of any of Clauses 1-10, further comprising a communication device removably coupled to one or more of the plurality of rail cars, wherein the communication device allows for communication with the braking control unit.

Clause 12. The system of any of Clauses 1-11, further comprising a portable air supply removably coupled to the one or more of the plurality of rail cars.

Clause 13. A method comprising:
communicatively coupling a braking control unit brakes of a plurality of rail cars of a train that is configured to travel along a track having rails; and
controlling, by the braking control unit, the brakes of a subset of the plurality of rail cars in accordance with braking data.

Clause 14. The method of Clause 13, wherein the braking data is based on one or more of a number of the plurality of rail cars of the train, a grade of the track, a weight of each of the plurality of rail cars, or contents of each of the plurality of rail cars.

Clause 15. The method of Clauses 13 or 14, further comprising:
coupling one or more air compressor cars to one of the plurality of rail cars at an end of the train, wherein the one or more compressor cars comprise one or more air tanks and one or more air pumps that are configured to provide compressed air to the brakes;
engaging, by an indexer along the track, engage one or more of the plurality of rail cars; and
dumping, by a dumper along the track, contents from one or more of the plurality of rail cars.

Clause 16. The method of any of Clauses 13-15, wherein the braking control unit is remote from the train.

Clause 17. The method of any of Clauses 13-16, wherein the subset of the plurality of rail cars comprises at least two braking rail cars separated by a plurality of uncontrolled rail cars, wherein the brakes of the at least two braking rail cars are controlled by the braking control unit, and wherein the brakes of the plurality of uncontrolled rail cars are not controlled by the braking control unit.

Clause 18. The method of any of Clauses 13-17, further comprising automatically determining, by the braking control unit, a number of rail cars of the train.

Clause 19. The method of any of Clauses 13-18, further comprising:
removably coupling a communication device to one or more of the plurality of rail cars, wherein the communication device allows for communication with the braking control unit; and
removably coupling a portable air supply to the one or more of the plurality of rail cars.

Clause 20. A system comprising:
a train including a plurality of rail cars configured to travel along a track having rails, wherein each of the plurality of rail cars comprises brakes;
one or more air compressor cars coupled to one of the plurality of rail cars at an end of the train, wherein the one or more compressor cars comprise one or more air tanks and one or more air pumps that are configured to provide compressed air to the brakes;
an indexer along the track, wherein the indexer is configured to engage one or more of the plurality of rail cars;
a dumper along the track, wherein the dumper is configured to dump contents from one or more of the plurality of rail cars; and
a braking control unit in communication with the brakes of the plurality of rail cars,
wherein the braking control unit is configured to control the brakes of a subset of the plurality of rail cars in accordance with braking data,
wherein the braking control unit is further configured to automatically determine a number of rail cars of the train,
wherein the subset of the plurality of rail cars comprises at least two braking rail cars separated by a plurality of uncontrolled rail cars, wherein the brakes of the at least two braking rail cars are controlled by the braking control unit, and wherein the brakes of the plurality of uncontrolled rail cars are not controlled by the braking control unit, and
wherein the braking data is based on the number of the plurality of rail cars of the train, a grade of the track, a weight of each of the plurality of rail cars, and contents of each of the plurality of rail cars.

As described herein, embodiments of the present disclosure provide systems and methods for coordinating braking of rail cars that are being indexed. Further, embodiments of the present disclosure provide systems and methods for reducing wave energy traveling through rail cars of a train being indexed and dumped.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed:

1. A system comprising:
a train including rail cars configured to travel along a track having rails, wherein each of the rail cars comprises brakes, wherein the rail cars include loaded rails cars and unloaded rails cars, and wherein a ratio of loaded rail cars to unloaded rail cars changes; and
a braking control unit in communication with the brakes of the rail cars,
wherein the braking control unit is configured to adaptively control the brakes of a subset of the rail cars in accordance with braking data based on one or both of a change in a number of rail cars in the train, or a change in the ratio of loaded rail cars to unloaded rail cars.

2. The system of claim 1, wherein the braking data is based on the number of the rail cars of the train.

3. The system of claim 1, wherein the braking data is based on a grade of the track.

4. The system of claim 1, wherein the braking data is based on one or both of a weight of each of the rail cars or contents of each of the rail cars.

5. The system of claim 1, wherein the subset of the rail cars comprises at least two braking rail cars separated by uncontrolled rail cars, wherein the brakes of the at least two braking rail cars are controlled by the braking control unit, and wherein the brakes of the uncontrolled rail cars are not controlled by the braking control unit.

6. The system of claim 1, wherein the braking control unit is further configured to automatically determine the number of rail cars of the train.

7. The system of claim 1, further comprising a communication device removably coupled to one or more of the rail cars, wherein the communication device allows for communication with the braking control unit.

8. The system of claim 1, further comprising a portable air supply removably coupled to the one or more of the plurality of rail cars.

9. A method comprising:
communicatively coupling a braking control unit with brakes of a rail cars of a train that is configured to travel along a track having rails, wherein the rail cars include loaded rails cars and unloaded rails cars, and wherein a ratio of loaded rail cars to unloaded rail cars changes; and
adaptively controlling, by the braking control unit, the brakes of a subset of the rail cars in accordance with braking data based on one or both of a change in a number of rail cars in the train, or a change in the ratio of loaded rail cars to unloaded rail cars.

10. The method of claim 9, wherein the braking data is based on the number of the rail cars of the train, a grade of the track, a weight of each of the rail cars, and contents of each of the rail cars.

11. The method of claim 9, further comprising:
coupling one or more air compressor cars to one of the rail cars at an end of the train, wherein the one or more compressor cars comprise one or more air tanks and one or more air pumps that are configured to provide compressed air to the brakes;
engaging, by an indexer along the track, one or more of the rail cars; and
dumping, by a dumper along the track, contents from one or more of the rail the train.

12. The method of claim 9, wherein the braking control unit is remote from the train.

13. The method of claim 9, wherein the subset of the rail cars comprises at least two braking rail cars separated by uncontrolled rail cars, wherein the brakes of the at least two braking rail cars are controlled by the braking control unit, and wherein the brakes of the uncontrolled rail cars are not controlled by the braking control unit.

14. The method of claim 9, further comprising automatically determining, by the braking control unit, the number of rail cars of the train.

15. The method of claim 9, further comprising:
removably coupling a communication device to one or more of the rail cars, wherein the communication device allows for communication with the braking control unit; and
removably coupling a portable air supply to the one or more of the rail cars.

16. A system comprising:
a train including rail cars configured to travel along a track having rails, wherein each of the rail cars comprises brakes, wherein the rail cars include loaded rails cars and unloaded rails cars, and wherein a ratio of loaded rail cars to unloaded rail cars changes;

one or more air compressor cars coupled to one of the rail cars at an end of the train, wherein the one or more compressor cars comprise one or more air tanks and one or more air pumps that are configured to provide compressed air to the brakes;

an indexer along the track, wherein the indexer is configured to engage one or more of the rail cars;

a dumper along the track, wherein the dumper is configured to dump contents from one or more of the rail cars; and a braking control unit in communication with the brakes of the rail cars, wherein the braking control unit is configured to adaptively control the brakes of a subset of the rail cars in accordance with braking data based on one or both of a change in a number of rail cars in the train, or a change in the ratio of loaded rail cars to unloaded rail cars, wherein the braking control unit is further configured to automatically determine the number of rail cars of the train, wherein the subset of the rail cars comprises at least two braking rail cars separated by uncontrolled rail cars, wherein the brakes of the at least two braking rail cars are controlled by the braking control unit, and wherein the brakes of the uncontrolled rail cars are not controlled by the braking control unit, and wherein the braking data is based on the number of the rail cars of the train, a grade of the track, a weight of each of the rail cars, and contents of each of the rail cars.

17. The system of claim 1, wherein the braking control unit is configured to adaptively control the brakes of the subset of the rail cars in accordance with the braking data based on the change in the number of rail cars in the train.

18. The system of claim 1, wherein the braking control unit is configured to adaptively control the brakes of the subset of the rail cars in accordance with the braking data based on the change in the ratio of loaded rail cars to unloaded rail cars.

19. The system of claim 1, wherein the braking control unit is configured to adaptively control the brakes of the subset of the rail cars in accordance with braking data based on the change in the number of rail cars in the train, and the change in the ratio of loaded rail cars to unloaded rail cars.

20. The system of claim 1, wherein the subset changes as the ratio changes.

21. The system of claim 1, further comprising one or more air compressor cars coupled to one of the rail cars at an end of the train, wherein the one or more compressor cars comprise one or more air tanks and one or more air pumps that are configured to provide compressed air to the brakes.

22. The system of claim 1, further comprising:
an indexer along the track, wherein the indexer is configured to engage one or more of the rail cars; and
a dumper along the track, wherein the dumper is configured to dump contents from one or more of the rail cars.

23. The system of claim 1, wherein the braking control unit is remote from the train.

24. The system of claim 5, wherein the uncontrolled rail cars comprises at least nine uncontrolled rail cars.

* * * * *